(12) United States Patent
Pasupathy et al.

(10) Patent No.: US 8,782,028 B1
(45) Date of Patent: Jul. 15, 2014

(54) PROXYING SEARCH REQUESTS FOR FILES TO A SEARCH ENGINE

(75) Inventors: Shankar Pasupathy, Milpitas, CA (US); Timothy C. Bisson, San Jose, CA (US); Nam M. Le, Los Gatos, CA (US)

(73) Assignee: Netapp, Inc., Sunnyvale, CA (US)

( * ) Notice: Subject to any disclaimer, the term of this patent is extended or adjusted under 35 U.S.C. 154(b) by 0 days.

(21) Appl. No.: 13/445,693

(22) Filed: Apr. 12, 2012

Related U.S. Application Data

(63) Continuation of application No. 12/606,076, filed on Oct. 26, 2009, now Pat. No. 8,386,446.

(51) Int. Cl.
*G06F 17/30* (2006.01)

(52) U.S. Cl.
USPC .......................... 707/706; 707/707; 707/760

(58) Field of Classification Search
USPC ......................................... 707/706, 707, 760
See application file for complete search history.

(56) References Cited

U.S. PATENT DOCUMENTS

| | | | |
|---|---|---|---|
| 2003/0050959 A1 | 3/2003 | Faybishenko | |
| 2003/0126120 A1* | 7/2003 | Faybishenko et al. | 707/3 |
| 2003/0182322 A1 | 9/2003 | Manley | |
| 2008/0154870 A1* | 6/2008 | Evermann et al. | 707/4 |
| 2008/0244429 A1* | 10/2008 | Stading | 715/764 |
| 2009/0006496 A1 | 1/2009 | Shoens | |
| 2009/0024650 A1* | 1/2009 | Kamani et al. | 707/102 |
| 2009/0164474 A1* | 6/2009 | Noumeir | 707/10 |

OTHER PUBLICATIONS

U.S. Appl. No. 12/606,076, filed Oct. 26, 2009, Bisson.
Andrew et al. "Spyglass: Fast, Scalable Metadata search for Large-scale Storage systems", Technical Report UCSC-SSRC-08-01, May 2008.
Office Action dated Jun. 22, 2012 issued by the USPTO for U.S. Appl. No. 12/606,076.

* cited by examiner

*Primary Examiner* — Cindy Nguyen
(74) *Attorney, Agent, or Firm* — Kacvinsky Daisak Bluni PLLC

(57) ABSTRACT

A method and apparatus for proxying search requests for a storage system and maintaining a central index for performing the search requests is described herein. An index manager on the storage system may initially produce the central index by examining each file in a file system and update the central index thereafter by examining only those files that have changed since the central index was initially produced or last updated. The index manager may receive a changed file list from a differencing layer configured for comparing snapshots of the file system at different time points to produce changed file lists. A search proxy module may receive search requests in a search protocol and proxy the search requests to a search engine by converting the search requests to another search protocol compatible with the search engine. The search engine may then use the central index for performing the search request.

18 Claims, 11 Drawing Sheets

PROXYING SEARCH REQUESTS FOR FILES TO A SEARCH ENGINE

RELATED APPLICATIONS

This patent application claims benefit to and is a continuation of the United States Patent Application entitled "PROXYING SEARCH REQUESTS FOR FILES TO A SEARCH ENGINE," having Ser. No. 12/606,076 filed on Oct. 26, 2009 now U.S. Pat. No. 8,386,446, which is expressly incorporated herein by reference.

FIELD OF THE INVENTION

The present invention relates to storage systems, and particularly, to proxying search requests for files to a search engine.

BACKGROUND OF THE INVENTION

A storage system is a processing system adapted to store and retrieve information/data on storage devices (such as disks). The storage system includes a storage operating system that implements a file system to logically organize the information as a hierarchical structure of directories and files on the storage devices. Each file may comprise a set of data blocks, whereas each directory may be implemented as a specially-formatted file in which information about other files and directories are stored.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from NetApp, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system is typically implemented as one or more storage volumes that comprise physical storage devices, defining an overall logical arrangement of storage space. Available storage system implementations can serve a large number of discrete volumes, each volume having a separate file system associated therewith. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow client systems to access its contents, for example, to read or write data to the storage system. A client system may comprise, for example, a personal computer (PC), workstation, laptop, or any other type of computer device for interacting with the storage system. A client system may execute an application that "connects" to the storage system over a computer network, such as a shared local area network (LAN), wide area network (WAN), or virtual private network (VPN) implemented over a public network such as the Internet. The application executing on the client system may send an access request (read or write request) to the storage system for accessing particular data stored on the storage system.

An application executing on the client system may also send a search request to the storage system for searching for particular files of a file system on the storage system. The search request may comprise a content search request for a search based on file content (content search) and/or a metadata search request for a search based on file metadata (metadata search). The search request may be in a format in accordance with a particular search protocol. For example, a Windows® based client may submit a search request in Windows Search Protocol (WSP) to a Windows® based storage system that is configured to receive and perform the search request.

Some storage systems, however, may not be configured for performing content or metadata searches and/or be able to process search requests in particular search protocols. For example, some search protocols (e.g., WSP) may be embedded/integrated within a network file protocol (e.g., Common Internet File System protocol or Network File System protocol) so that the data of the search request is embedded/integrated within data for the network file protocol. Some storage systems may be incompatible with such search request and not be capable of processing the search requests. As such, there is a need for a method for providing search capabilities to storage systems not configured for such having search capabilities.

To enhance search capabilities, a search engine may produce and store (e.g., to the storage system) a central index comprising a content index (for indexing file content) and a metadata index (for indexing file metadata). The central index may be produced by examining each file in the file system and storing content and metadata information regarding each file into the central index. A received search request may then be performed on the central index, rather than examining and searching each individual file in the file system, to reduce the time and resources required to perform the search request. However, the storage system may expend significant time and resources to maintain the central index as each file in the file system is typically re-examined for determining file changes (e.g., file additions, modifications, deletions) at predetermined time intervals to periodically update the central index. As such, there is a need for a method and apparatus for indexing files of a storage system more efficiently.

SUMMARY OF THE INVENTION

A method and apparatus for proxying search requests for a storage system and efficiently maintaining a central index for search requests is described herein. In some embodiments, an index manager module/engine residing in the storage operating system may produce and update a central index used for performing search requests as described herein. In these embodiments, the index manager module may initially produce the central index by examining each file in the file system and update the central index by re-examining, at predetermined time intervals, only those files that have changed since the central index was last updated. As such, the storage system may update the central index using less time and resources. In some embodiments, a search proxy module/engine residing in the storage operating system may proxy search requests to a separate search engine by converting the search requests to a search protocol compatible with the search engine. For example, the search proxy module may receive search requests from clients in a first search protocol (SP1) and convert the search requests to a second search protocol (SP2) that is compatible with the search engine (the first and second search protocols being different search protocols). The search engine may then use the central index for performing the search request. As such, search capabilities may be provided to a storage system to process search requests in various search protocols.

To enhance search capabilities, the index manager module may produce a central index used for performing search requests received from a plurality of clients. In these embodiments, a single central index (for each volume) may be used for performing search requests received from all clients accessing the storage system, rather than using individual local indexes that are stored on each individual client. A central index may be produced and updated for each volume in the storage system, each volume having a file system comprising a plurality of files. Each central index may comprise index data (content and metadata data) describing each file in the file system, the index data of the files being used to perform search requests on the files. In particular, each central index may comprise a content index (for storing content index data) and a metadata index (for storing metadata index data). The central index may be initially produced by examining each file in the file system and storing content index data to the content index and storing metadata index data to the metadata index. After initially producing the central index, the index manager module may thereafter periodically continue to update the central index at predetermined time intervals.

Upon the expiration of a predetermined time interval, the index manager module may initiate/trigger updating procedures for the central index. Updating procedures may include 1) determining a "changed file list" of zero or more files in the file system that have changed since a previous time the central index was initially produced or last updated and 2) examining only those files specified in the changed file list for updating the central index. In some embodiments, a changed file may comprise any file in the file system that has been modified, deleted, or created since the central index was initially produced or last updated. In some embodiments, the index manager module determine the changed file list by implementing a differencing layer/engine residing in the storage operating system.

For example, the differencing layer may produce a first snapshot of the file system when the central index was initially produced or last updated (comprising a first point in time), produce a second snapshot of the file system when the central index is currently being updated (comprising a second point in time), and then determine a difference/delta (changed file list) between the first and second snapshots. As known in the art, a snapshot of a file system may comprise a persistent point in time (PPT) image of the file system. The changed file list may represent the difference/delta between the first and second snapshots, the changed file list specifying zero or more files in the file system that have changed (modified, deleted, or created) between the first and second points in time. As such, only those files in the changed file list need to be examined during updates to the central index, thus consuming less time and resources of the storage system in maintaining the central index.

In some embodiments, the storage system may use the search proxy module to receive search requests from clients and proxy the search requests to a separate search engine by converting the search requests to the search protocol format of the search engine. For example, the search proxy module may receive search requests from clients in a first search protocol (SP1) and convert the search requests to a second search protocol (SP2) that is compatible with the search engine. The search engine may perform the search requests using the central index and send the search results to the search proxy module. The search proxy module may then convert and send the search results to the first search protocol (SP1) compatible with the client. As such, search capabilities may be provided to storage systems not configured for searching files. Also, search services may be provided to clients transparently, as the storage system proxies received search requests to a separate search engine without the clients having knowledge of the search proxying.

BRIEF DESCRIPTION OF THE DRAWINGS

The novel features are set forth in the appended claims. However, for purpose of explanation, several embodiments of the invention are set forth in the following figures.

DETAILED DESCRIPTION

The disclosure of United States Patent Application entitled "PROXYING SEARCH REQUESTS FOR FILES TO A SEARCH ENGINE," having Ser. No. 12/606,076 filed on Oct. 26, 2009, is expressly incorporated herein by reference.

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into three sections. Section I describes a storage system environment in which some embodiments operate. Section II describes methods and apparatus for producing and updating a central index for performing search requests on files of a file system. Section III describes methods and apparatus for proxying search requests to a search engine.

I. Storage System Environment

Figure 1:
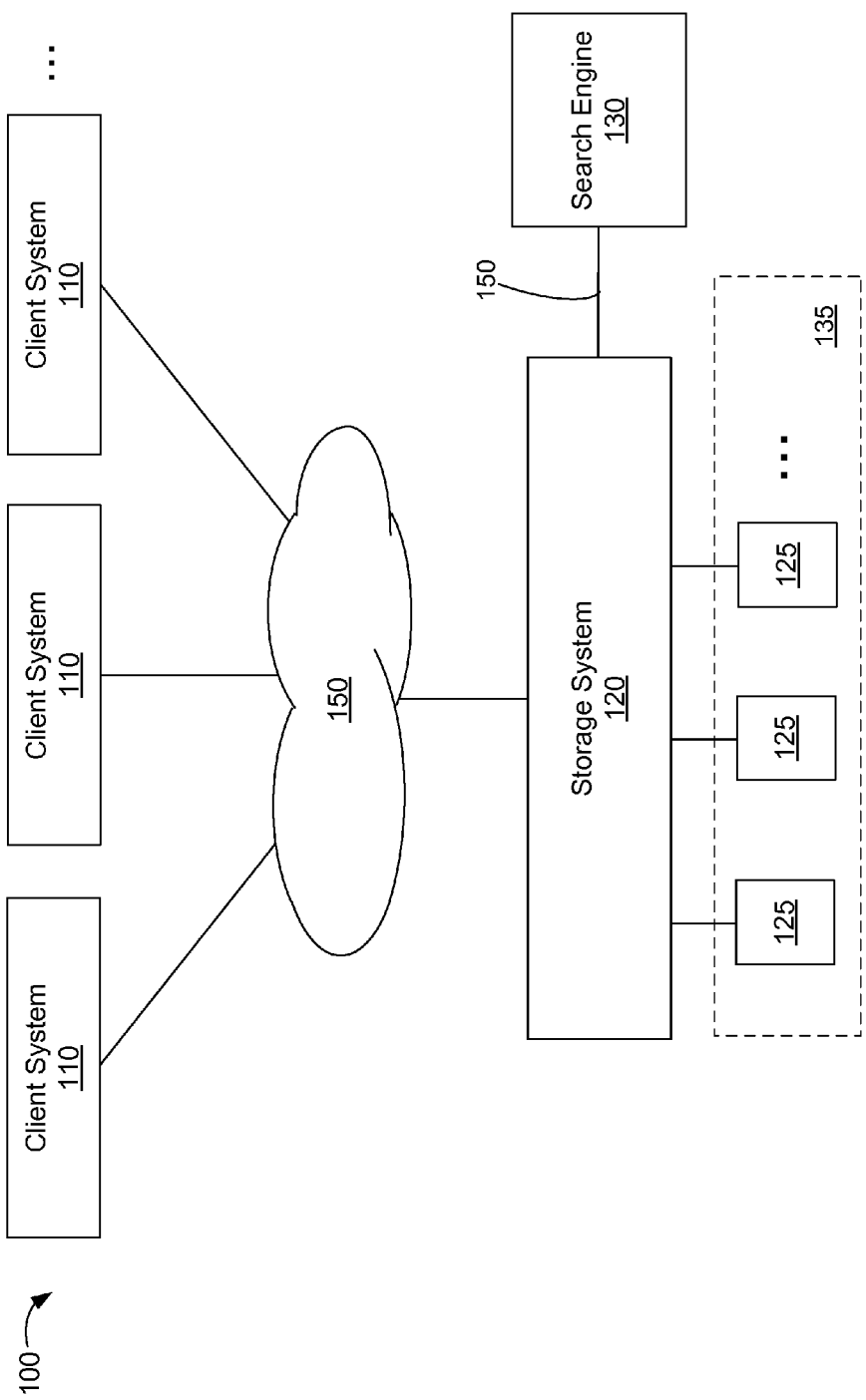
FIG. 1 is a schematic block diagram of an exemplary storage system environment in which some embodiments operate.

FIG. 1 is a schematic block diagram of an exemplary storage system environment 100 in which some embodiments operate. The environment 100 comprises one or more client systems 110 and a storage system 120 that are connected via a connection system 150. The storage system 120 may comprise a set of one or more storage devices 125 that collectively provide a shared storage 135 of the storage system 120. The connection system 150 may comprise a network, such as a Local Area Network (LAN), Wide Area Network (WAN), metropolitan area network (MAN), the Internet, or any other type of network or communication system between computer systems.

A client system 110 may comprise a computer system that utilizes services of the storage system 120 to store and manage data in the storage devices 125 of the storage system 120. A client system 110 may execute one or more applications that submit access (read/write) requests for reading/writing data on the storage devices 125 of the storage system 120 and search requests for searching files on the storage devices 125 of the storage system 120. The embodiments below are described in relation to a file. In other embodiments, however, any other type of data container may be used (e.g., logical unit, volume, etc.). Interaction between a client system 110 and the storage system 120 can enable the provision of storage services. That is, client system 110 may request the services of the storage system 120 (e.g., through read/write or search requests), and the storage system 120 may perform the requests and return responses for the services requested by the client system 110 (by exchanging packets over the connection system 150).

The client system 110 may submit access requests (read/write requests) by issuing packets using file-based access protocols, such as the Common Internet File System (CIFS) protocol or Network File System (NFS) protocol, over the Transmission Control Protocol/Internet Protocol (TCP/IP) when accessing data in the form of files and directories. Alternatively, the client system 110 may issue access requests by issuing packets using block-based access protocols, such as the Fibre Channel Protocol (FCP), or Internet Small Computer System Interface (iSCSI) Storage Area Network (SAN) access, when accessing data in the form of blocks.

The client system 110 may also submit search requests to the storage system for searching for particular files of a file system on the storage system. The search request may comprise a content search request for a search based on file content (content search) and/or a metadata search request for a search based on file metadata (metadata search). The client system 110 may submit search requests by issuing packets in a format in accordance with a particular search protocol.

For example, a Windows® based client may submit a search request in Windows Search Protocol (WSP). However, a non-Windows® based storage system 120 may not be configured for performing content or metadata searches of its files and/or be able to process search requests in particular search protocols. For example, some search protocols (e.g., WSP) may be embedded/integrated within a network file protocol (e.g., Common Internet File System protocol or Network File System protocol) so that the data of the search request is embedded/integrated within the network file protocol data. Thus, the storage system 120 may be incompatible with such a search request and not be capable of processing the search request. In some embodiments, the storage system 120 uses a search proxy module to proxy received search requests to a separate search engine by converting the search requests to the search protocol format of the search engine.

The storage system 120 may comprise a computer system that stores data in a set of one or more storage devices 125 (that collectively comprise a shared storage 135 of the storage system 120). A storage device 125 may comprise a writable storage device media, such as disk devices, video tape, optical, DVD, magnetic tape, various types of solid state memory, flash memory, Magnetic Random Access Memory (MRAM), Phase Change RAM (PRAM), and any other similar media adapted to store information (including data and parity information).

The storage system 120 may implement a file system to logically organize the data as a hierarchical structure of directories and files on the storage devices 125. Each file may be implemented as a set of blocks configured to store data, whereas each directory may be implemented as a specially-formatted file in which information about other files and directories are stored. A block of a file may comprise a fixed-sized amount of data that comprises the smallest amount of storage space that may be accessed (read or written) on a storage device 125.

In some embodiments, the environment 100 also includes a search engine 130 connected to the storage system 120. The search engine 130 may be external to the storage system 120 and connected to the storage system 120 via a connection system 150. In other embodiments, the search engine 130 may be internal to the storage system 120. The search engine 130 may comprise hardware and/or software components similar to the storage system 120 and may include a network adapter, one or more processors, and memory interconnected by a system bus (as described below in relation to FIG. 2). The memory may store indexing and search software instructions/modules that are executable by the processor and adapters to produce a dedicated engine for indexing and searching files based on file content and metadata. The search engine 130 may be configured to receive and perform operational requests from the index manager and the search proxy modules.

The search engine 130 may comprise a search engine capable of indexing files based on content and metadata and capable of searching files based on content and metadata parameters. The search engine 130 may comprise an indexing engine, a content search engine, and a metadata search engine for performing embodiments described herein. The search engine 130 may comprise a third party search engine that is configured for processing search requests in a particular search protocol. In some embodiments, the indexing and search capabilities of the third party search engine may be leveraged by the storage system by proxying search requests to the third party search engine (by converting the search requests to the search protocol compatible with the third party search engine). Examples of search engines include IBM-Yahoo OmniFind, Kazeon, Google Search Appliance, etc. Examples of search protocols include WSP (Windows Search Protocol), Z39.50 (Library of Congress book catalog search protocol) WAIS (Wide Area Information Server), etc. In other embodiments, other search protocols are used by the search engine 130.

Figure 2:
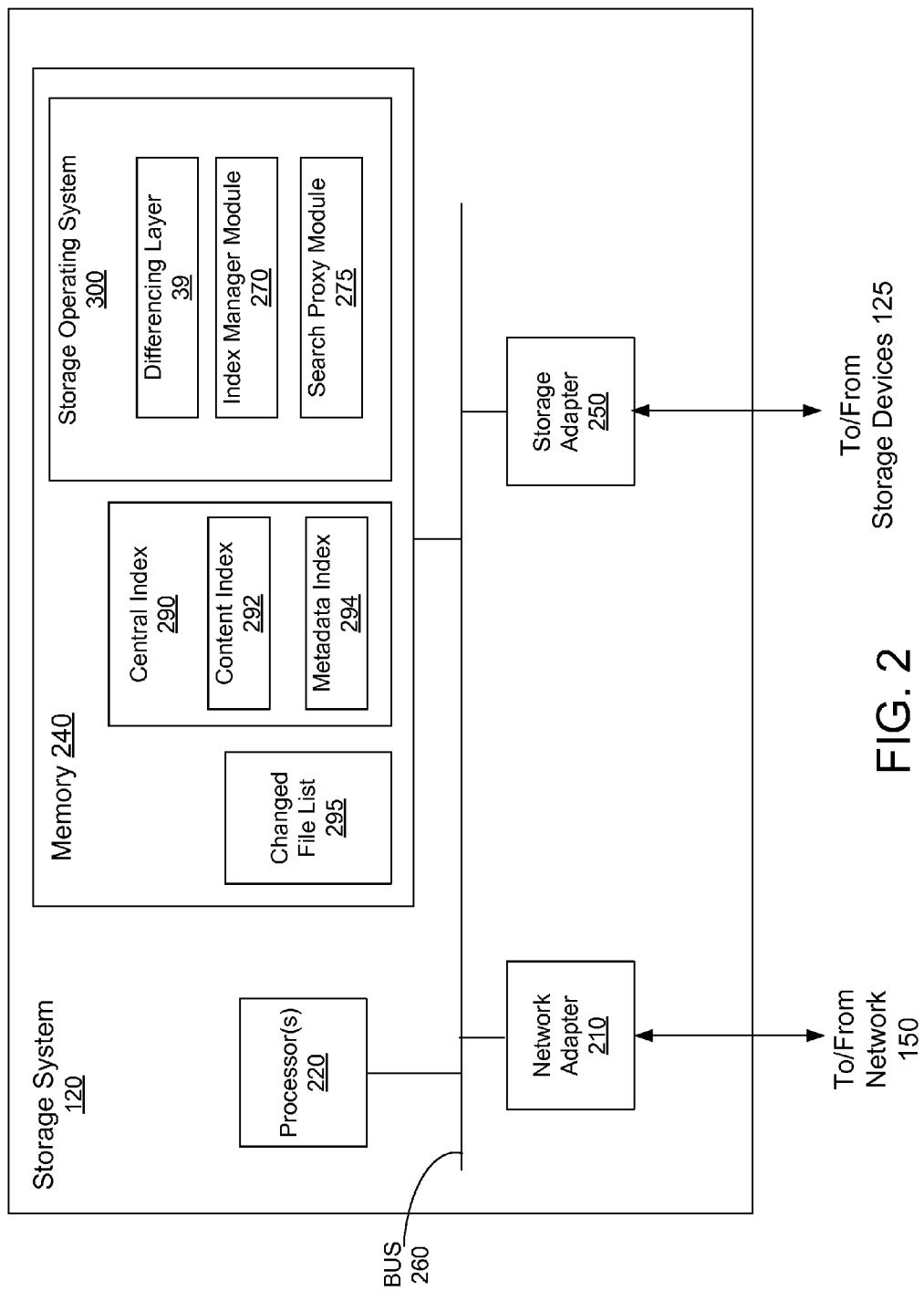
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a client computer. The term "storage system" should, therefore, be taken broadly to include such arrangements.

The storage system 120 comprises a network adapter 210, one or more processors 220, a memory 240, and a storage adapter 250 interconnected by a system bus 260. The network adapter 210 comprises the mechanical, electrical and signaling circuitry needed to connect the storage system 120 to a client system 110 over a computer network 150. The storage system may include one or more network adapters. Each network adapter 210 has a unique IP address and may provide one or more data access ports for client systems 110 to access the storage system 120 (where the network adapter accepts access and search requests from the client systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory (e.g., NVRAM) that does not require power to maintain information. The processor 220 and adapters may, in turn, comprise processing elements and/or logic circuitry configured to execute the software code and manipulate the data stored in the memory 240.

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a differencing layer 39, index manager module 270, and search proxy module 275) that are executed by the processor 220. Portions of the storage operating system 300 are typically resident in memory 240. It will be apparent to those skilled in the art, however, that other processing and memory means, including various computer readable media, may be used for storing and executing program instructions pertaining to the storage operating system 300.

In some embodiments, a central index data structure 290 is also resident in memory 240. In other embodiments, the central index 290 may also be stored on a storage device 125. As discussed below, in some embodiments, the central index 290 is produced by the index manager module 270 and used by the search engine 130 to perform received search requests. In other embodiments, the index manager module 270 may reside outside of the storage system (e.g., on the search engine 130). A central index 290 may be produced and maintained for each volume in the storage system, each volume having a file system comprising a plurality of files. Each central index may comprise index data (content and metadata data) describing each file in the file system, the index data of the files being used to perform search requests on the files. In particular, each central index 290 may comprise a content index 292 (for storing content index data) and a metadata index 294 (for storing metadata index data). In some embodiments, a changed file list 295 is also resident in memory 240. The changed file list 295 may comprise zero or more files in the file system that have changed since a previous time the central index was initially produced or last updated. The changed file list 295 may be produced by the differencing layer 39 and used by the index manager module 270 to update the central index 290.

The storage adapter 250 cooperates with the storage operating system 300 executing on the storage system 120 to access data requested by the client system 110. In some embodiments, the storage adapter 250 also cooperates with the storage operating system 300 to access data requested by the search engine 130 that may also request data for performing file indexing and searching as described herein. For example, when performing file indexing, the search engine 130 may request to read data of files in the file system for examination and indexing and request to write data to the central index 290 to store content and/or metadata index data. When performing search requests, the search engine 130 may request to read data from the central index 290 to perform the search requests. In these embodiments, access (read/write) requests received from the search engine 130 may be processed in a similar manner as access (read/write) requests received from a client system 110.

Requested data may be stored on the storage devices 125 that are attached, via the storage adapter 250, to the storage system 120 or other node of a storage system as defined herein. The storage adapter 250 includes input/output (I/O) interface circuitry that couples to the storage devices 125 over an I/O interconnect arrangement, such as a conventional high-performance, Fibre Channel serial link topology. In response to an access request received from a client system 110 or search engine 130, data may be retrieved by the storage adapter 250 and, if necessary, processed by the processor 220 (or the adapter 250 itself) prior to being forwarded over the system bus 260 to the network adapter 210, where the data may be formatted into a packet and returned to the client system 110 or search engine 130.

In an illustrative embodiment, the storage devices 125 may comprise disk devices that are arranged into a plurality of volumes, each volume having a file system associated therewith. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL® or any other type of file system) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
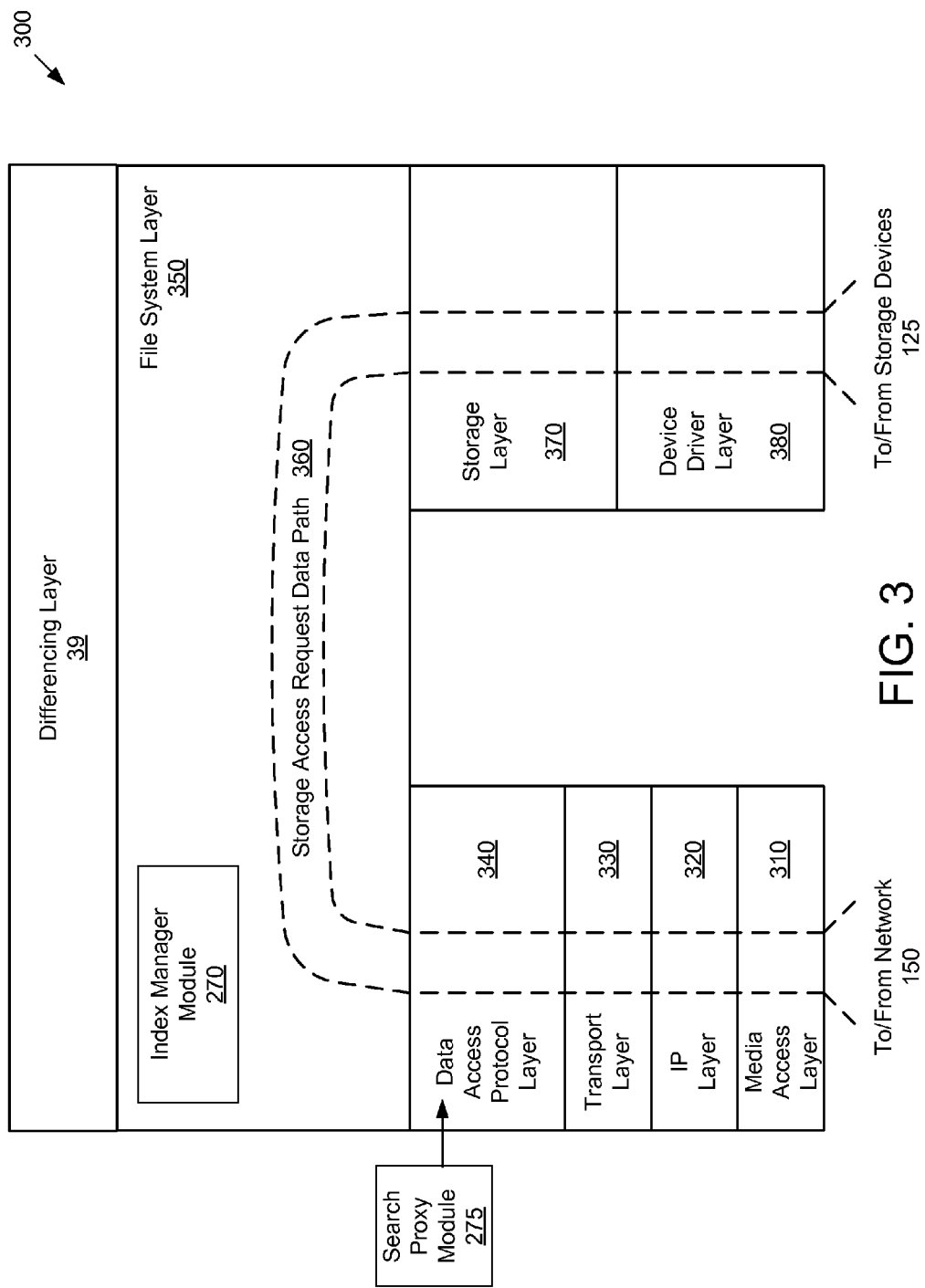
FIG. 3 is a schematic block diagram of an exemplary storage operating system that may be implemented by the storage system in FIG. 2.

As shown in FIG. 3, the storage operating system 300 comprises a set of software layers that form an integrated protocol software stack. The protocol stack provides data paths 360 for client systems 110 or the search engine 130 to access data stored on the storage system 120 using data-access protocols. It should be noted that the software "path" 360 through the storage operating system layers described below needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by client system 110 or the search engine 130. Moreover, in a further embodiment, the processing elements of network and storage adapters 210 and 250 may be configured to offload some or all of the packet processing and storage access operations, respectively, from processor 220 to thereby increase the performance of the data access service provided by the storage system 120.

The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for client systems 110 or the search engine 130 to access the storage system 120. In some embodiments, the IP layer 320 layer provides a dedicated private port for each of one or more remote-file access protocols implemented by the storage system 120.

A data-access protocol layer 340 provides multi-protocol data access and, for example, may include file-based access protocols, such as the Hypertext Transfer Protocol (HTTP) protocol, the NFS protocol, the CIFS protocol, and so forth. The storage operating system 300 may include support for other protocols, such as block-based access protocols. Such protocols may include, but are not limited to, the direct access file system (DAFS) protocol, the web-based distributed authoring and versioning (WebDAV) protocol, the Fibre Channel Protocol (FCP), the Internet small computer system interface (iSCSI) protocol, and so forth.

The storage operating system 300 may manage the storage devices 125 using storage-side layers comprising a storage layer 370 (that implements a storage protocol, such as a RAID protocol) and a device driver layer 380. Bridging the storage-side layers with the network and protocol layers is a file system layer 350 of the storage operating system 300. In an illustrative embodiment, the file system layer 350 implements a file system having an on-disk format representation that is block-based using inodes to describe the files. The file system layer 350 may assign, for each file, a unique inode number and an associated inode (comprising a data structure storing metadata information about the file and address locations of file blocks). The embodiments below are described in relation to a file system. In other embodiments, however, the file system layer 350 may comprise a management layer (e.g., Zettabyte File System, etc.) for producing a management system for managing and organizing files. The management system may comprise a file system having zero or more nested file systems (a file system within a file system). In these embodiments, the file system described herein may comprise a management system.

In response to receiving a file-access request (containing an external file handle) from a client system 110 or the search engine 130, the file system 350 generates operations to perform the request (such as storing data to or loading/retrieving data from the storage devices 125). The external file handle in the access request typically identifies a file or directory requested by the client system 110 or the search engine 130. Specifically, the file handle may specify a generation number, inode number and volume number corresponding to the accessed data. If the information is not resident in the storage system's memory 240, the file system layer 350 accesses the appropriate inode for the identified file and retrieves file block address locations from the inode.

The file system layer 350 may receive write requests comprising data blocks to be written and address locations specifying where the data blocks are to be stored, each received block having an associated address location where it is to be stored. The file system layer 350 may also receive read requests comprising address locations specifying from where data blocks are to be read/retrieved. The file system layer 350 may pass the received access (read/write) requests and specified address locations to the storage layer 370 and device driver layer 380 which further processes the access requests. An access request may be passed to an appropriate driver (for example, an encapsulation of SCSI implemented on a fibre channel interconnection) of the device driver layer 380 which implements a device control protocol (such as small computer system interface (SCSI), integrated drive electronics (IDE), etc.).

Using the received block address locations, the device driver layer 380 accesses the appropriate blocks from the storage devices 125 and loads requested data in memory 240 for processing by the storage system 120. Upon completion of the request, the storage system (and storage operating system) returns a response (e.g., a conventional acknowledgement packet defined by the CIFS specification) to the client system 110 or the search engine 130 over the network 150. For example, for a received write request, the response may comprise a message indicating whether the write request was performed successfully or not. For a received read request, the response may comprise the requested data.

In some embodiments, the storage operating system 300 also comprises a indexing manager module 270 that operates in conjunction with the other software layers of the storage operating system 300 and the search engine 130 to produce and update the central index 290. For example, in some embodiments, the indexing manager module 270 may reside and operate within the file system layer 350 of the storage operating system 300 (as shown in FIG. 3). In other embodiments, the indexing manager module 270 may reside and operate elsewhere in the storage operating system 300.

In some embodiments, the storage operating system 300 also comprises a search proxy module 275 that operates in conjunction with the other software layers of the storage operating system 300 and the search engine 130 to perform search requests. In particular, the search proxy module 275 may be used to proxy search requests to the search engine 130, the search requests being converted to a search protocol compatible with the search engine 130. For example, in some embodiments, the search proxy module 275 may reside and operate within the data-access protocol layer 340 of the storage operating system 300 (as shown in FIG. 3). In other embodiments, the search proxy module 275 may reside and operate elsewhere in the storage operating system 300.

In some embodiments, the storage operating system 300 also comprises a differencing layer 39 that operates in conjunction with the other software layers of the storage operating system 300 to produce a change file list 295 used to update the central index 290. The differencing layer 39 may logically reside on top of the file system 350 (as shown in FIG. 3). In other embodiments, the differencing layer 39 may reside and operate elsewhere in the storage operating system 300.

The differencing layer 39 may comprise an application layer that generates user-level difference information about two datasets to an output file (the output file comprising the changed file list). It is assumed that the storage operating system 300 is capable of acquiring "snapshots", at different points in time, of all data that it stores, or specified subsets thereof. A "snapshot" may comprise a persistent image of the exact state of the data maintained by the storage system 120 (or a specified subset thereof) at a given point in time, from which that state can be restored if necessary (e.g., in the event of a catastrophic loss of data). For example, a snapshot may be taken of all the data of a particular file system (e.g., the files and directories) at various points in time. Snapshots and the differencing layer 39 are discussed in detail in United States Patent Application 2006/0218135 by Timothy C. Bisson et al., filed Mar. 28, 2005, entitled "Method and Apparatus for Generating and Describing Block-level Difference Information about Two Snapshots," incorporated herein by reference.

In some embodiments, the differencing layer 39 may compare a first dataset and a second dataset, the first and second datasets each including a plurality of data blocks, to identify block-level differences therebetween, by comparing block-level metadata between the first and second datasets without comparing the contents of the data blocks; and a report generator to generate a report of the differences between the first and second dataset, the report indicating the differences in individual data blocks between the first and second dataset. For example, the first and second datasets may comprise snapshots of a file system at different times and the report generator may produce a changed file list 295 that lists zero or more files that have changed in the file system between the different times the snapshots were taken. Comparing snapshots of the file system to produce a changed file list 295 is discussed below in relation to FIG. 5C.

II. Producing and Updating a Central Index

Figure 4:
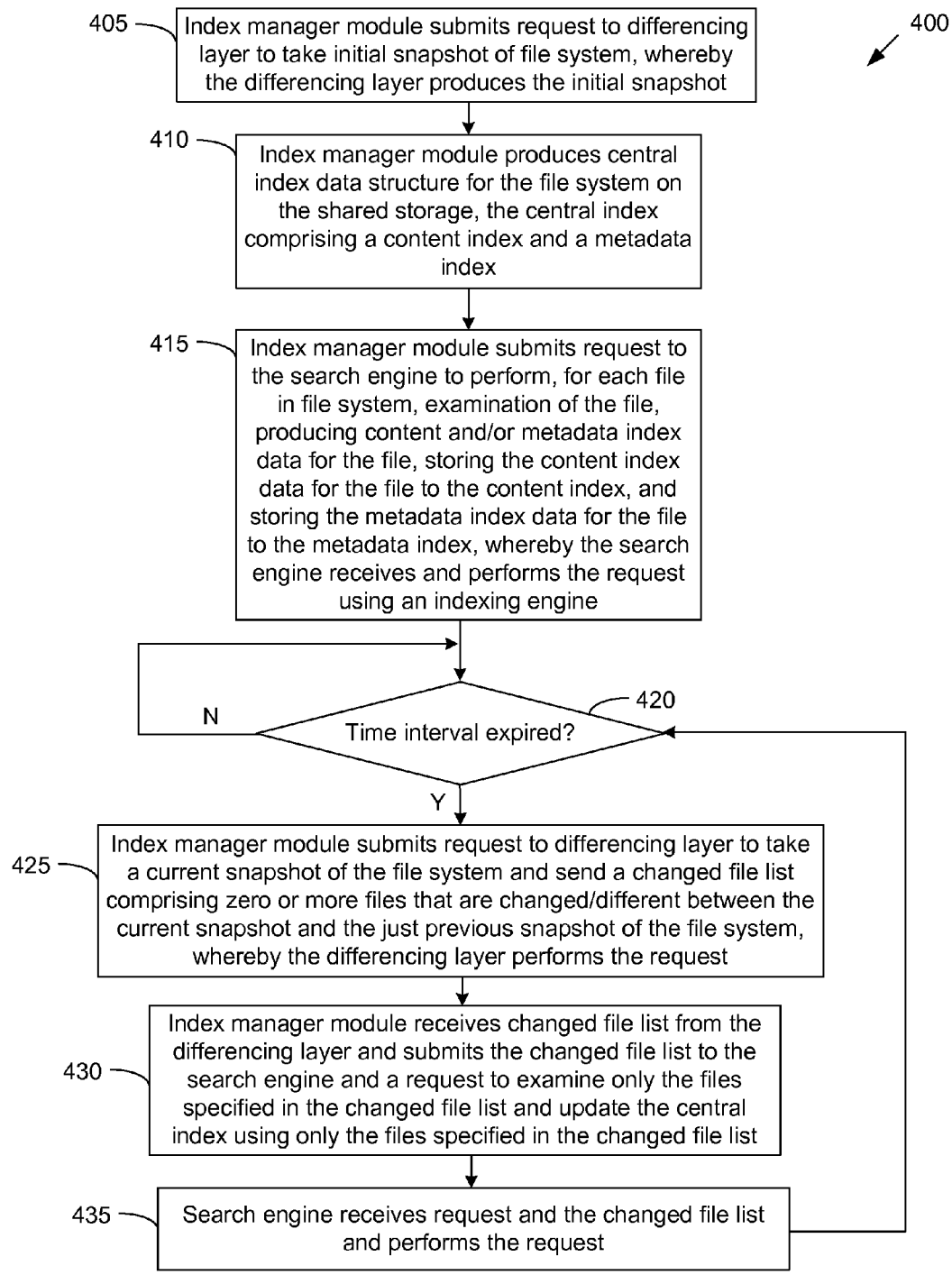
FIG. 4 is a flowchart of a method for producing and updating a central index for performing search requests on files of a file system.

FIG. 4 is a flowchart of a method 400 for producing and updating a central index for performing search requests on files of a file system. In some embodiments, some of the steps of the method 400 are implemented by software and/or hardware. In some embodiments, some of the steps of method 400 are performed by the index manager module 270 and the differencing layer 39 of the storage operating system 300 of the storage system 120 in conjunction with the search engine 130. The search engine 130 may be configured to receive and perform operational requests from the index manager module 270 to perform embodiments herein. The search engine 130 may be external to the storage system 120 and interacts with the storage operating system 300 via a connection system 150. In other embodiments, the search engine 130 may be internal to the storage system 120. The order and number of steps of the method 400 are for illustrative purposes only and, in other embodiments, a different order and/or number of steps are used. The method 400 is described in relation to FIGS. 5A-C that conceptually illustrate steps of the method 400. The method 400 may be used to produce and update a central index 290 for a file system of each volume in the shared storage 135 of the storage system 120, whereby each volume has its own central index 290.

The embodiments below are described in relation to a file. In other embodiments, however, any other type of data container may be used (e.g., logical unit, volume, etc.). The embodiments below are described in relation to a file system. In other embodiments, however, the file system layer 350 may comprise a management layer (e.g., Zettabyte File System, etc.) for producing a management system for managing and organizing files. The management system may comprise a file system having zero or more nested file systems (a file system within a file system). In these embodiments, the file system described herein may comprise a management system.

Figure 5A:
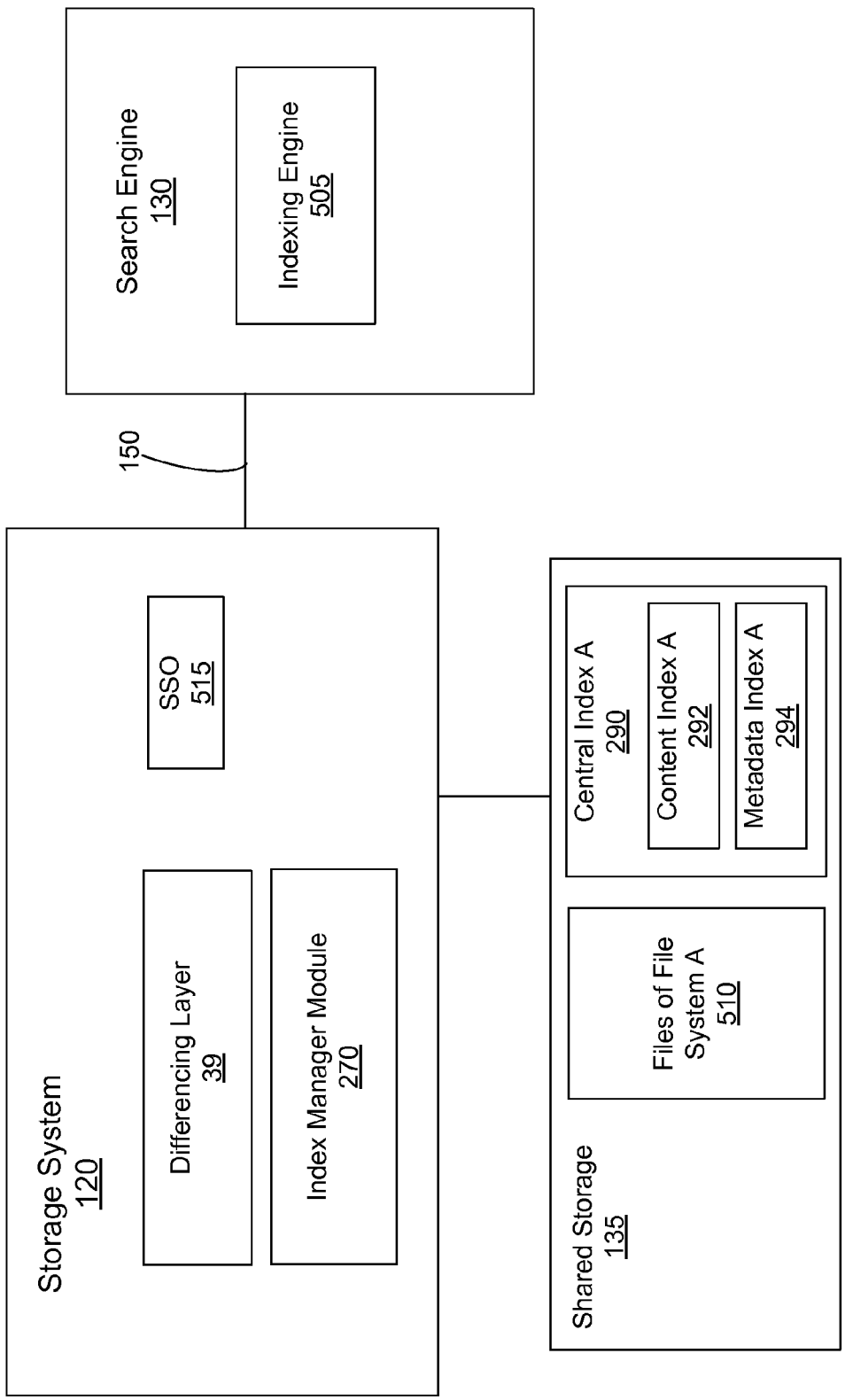
FIG. 5A shows a conceptual diagram of components of the storage system environment used for initially producing the central index.

The method 400 begins when the index manager module 270 submits (at 405) a request to the differencing layer 39 to take an initial snapshot (SS0) of all the data (e.g., the files and directories) of a file system of a particular volume in the shared storage 135, whereby the differencing layer 39 produces the initial snapshot (SS0). FIG. 5A shows a conceptual diagram of components of the storage system environment 100 used for initially producing the central index 290. As shown in the example of FIG. 5A, the shared storage 135 stores files of file system A. An initial snapshot (SS0) 515 is produced of file system A and is stored on the storage system 120 (e.g., stored in memory 240).

The index manager module 270 then produces (at 410) a central index data structure 290 for the file system on the shared storage 135, the central index 290 comprising a content index 292 and a metadata index 294 (as shown in FIG. 5A). The content index 292 and metadata index 294 may each comprise a plurality of entries for representing files. The central index 290 may initially contain null data.

The index manager module 270 then submits (at 415) a request to the search engine 130 to perform, for each file in file system, examination of the file to produce and store index data for the file to the central index 290, whereby the search engine 130 receives and performs the request using an indexing engine 505 (as shown in FIG. 5A). In particular, the index manager module 270 may submit (at 415) a request to the search engine 130 to perform, for each file in file system, examination of the file, producing content and/or metadata index data for the file, storing the content index data for the file to the content index 292, and storing the metadata index data for the file to the metadata index 294, whereby the search engine 130 receives and performs the request using the indexing engine 505.

To perform the request, the indexing engine 505 may "crawl" the entire file system to locate each file in the file system by traversing the file system tree (e.g., by starting from the root directory to determine a list of files/directories under the root directory, then for each subdirectory, determine a list of files/directories under the subdirectory, etc.). The indexing engine 505 may use commonly known crawl algorithms such as depth-first/breadth first searching. For each located file, the indexing engine 505 of the search engine 130 may produce an entry in both the content index 292 and the metadata index 294, the entry representing the file.

An entry in the content or metadata indexes may comprise a plurality of data fields, such as a field for storing a file identifier (e.g., inode number) of the file that is represented by the entry. In the content index 292, each entry may also contain fields for storing content of the file, such as terms or phrases contained in the file. Which terms or phrases of a file are included in the entry may depend on the content indexing software used by the indexing engine 505. Common content indexing software include Lucene, etc. In the metadata index 294, each entry may also contain fields for storing various attributes of the file that describe the file, such as file size, file type, data and time the file was created, modified, accessed, etc.

After initially producing the central index 290 (at steps 405-415), the method 400 then periodically updates the central index at predetermined time intervals. At step 420, the index manager module 270 determines (at 420) if the predetermined time interval has expired. If not, the method continues at step 420. If so, the index manager module 270 then submits (at 425) a request to the differencing layer 39 to take a current snapshot (e.g., SS1) of the file system and send a changed file list 295 comprising zero or more files that are changed/different between the current snapshot and the just previous snapshot of the file system (e.g., SS0), whereby the differencing layer 39 receives and performs the request. The changed file list 295 may specify the files in the file system that have changed (been modified, deleted, or created) since a previous time the central index 290 was initially produced or last updated. Each file in the changed file list 295 may be specified by a file identifier (e.g., inode number).

The index manager module 270 then receives (at 430) the changed file list 295 from the differencing layer 39 and submits the changed file list 295 to the search engine 130 along with an "update request" to examine only the files specified in the changed file list 295 and update the central index 290 based on/using only the files specified in the changed file list 295. In particular, the index manager module 270 may submit, to the search engine 130, an update request to examine only the files specified in the changed file list 295, produce content and/or metadata index data for each file, store the content index data for each file to the content index 292, and store the metadata index data for each file to the metadata index 294.

The search engine 130 then receives (at 435) the update request and the changed file list 295 and performs the update request based on the changed file list 295. To perform the request, the indexing engine 505 of the search engine 130 may locate and examine, and then produce and store new content and metadata index data (indicating the file modification, deletion, or creation) in the central index for only those files listed in the changed file list 295. As such, when updating the central index, only files in the changed file list 295 are examined, and all files in the file system are not examined (unless all files have changed since the last update), as is conventionally done. The method 400 then continues at step 420.

Figure 5B:
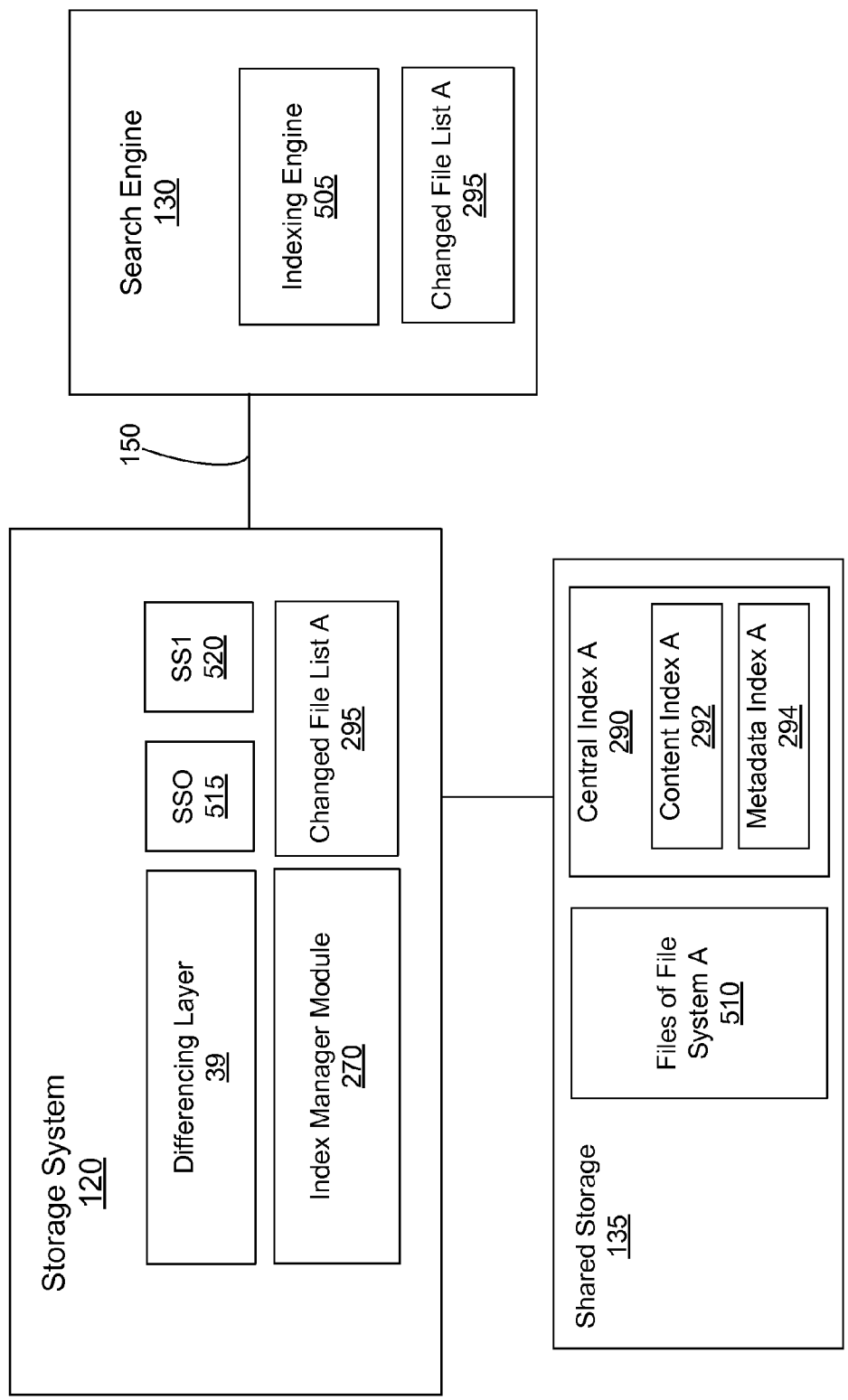
FIG. 5B shows a conceptual diagram of components of the storage system environment used for updating the central index.

FIG. 5B shows a conceptual diagram of components of the storage system environment 100 used for updating the central index 290. As shown in the example of FIG. 5B, a current snapshot (SS1) 520 is produced of file system A and is stored on the storage system 120 (e.g., stored in memory 240). The differencing layer 39 then produces a changed file list A 295 reflecting the difference/delta between the current snapshot (e.g., SS1) of file system A and the just previous snapshot of the file system A (e.g., SS0). The index manager module 270 sends changed file list A to the search engine 130 which then locally stores and processes changed file list A to update central index A using the indexing engine 505.

Figure 5C:
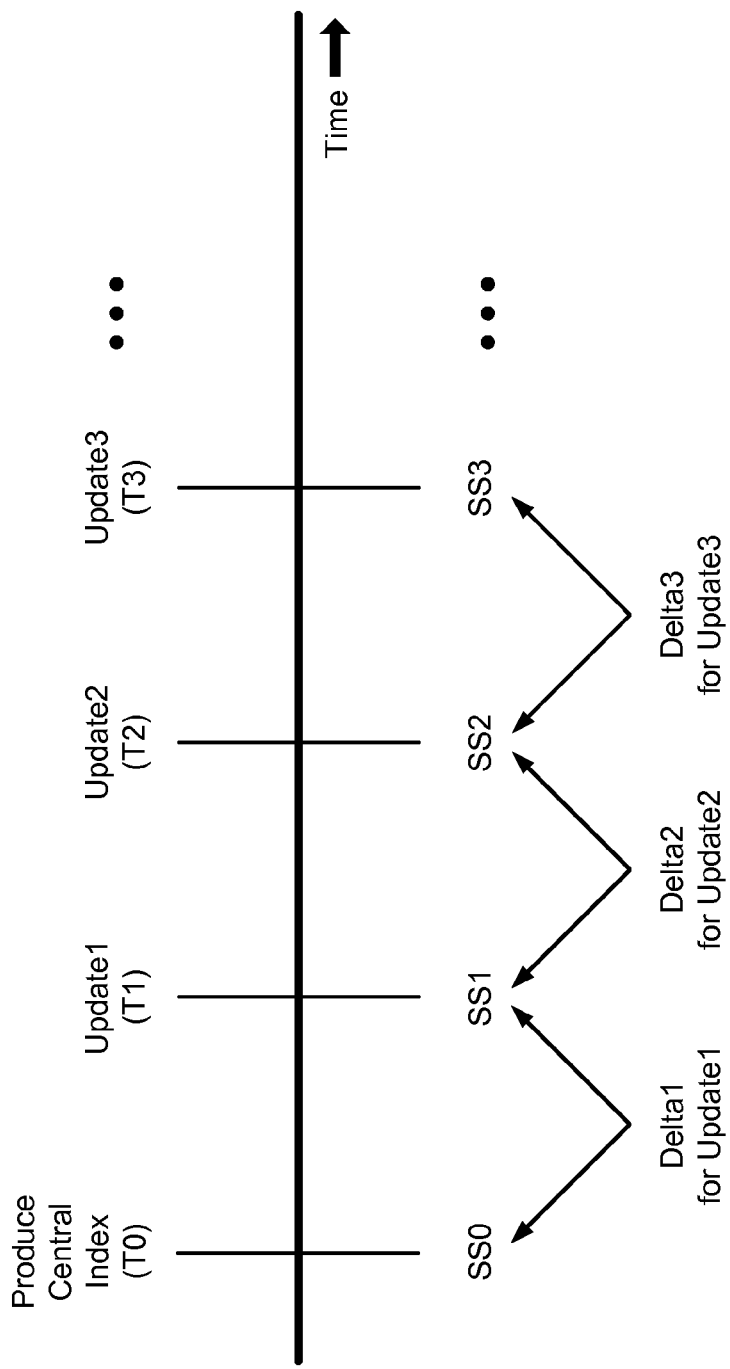
FIG. 5C shows a conceptual diagram of a timeline of events in producing and updating of the central index.

FIG. 5C shows a conceptual diagram of a timeline of events in producing and updating of the central index 290. The point in time the central index 290 is initially produced may comprise a first time point T0, and the points in time of the expirations of each subsequent predetermined time interval thereafter may comprise subsequent points in time T1, T2, T3, etc.

As shown in FIG. 5C, when the central index 290 is initially produced (at time T0), a first snapshot (SS0) of the file system is produced. When the central index 290 is first updated (at time T1), a second snapshot (SS1) of the file system is produced. Each snapshot of the file system may comprise a dataset. The differencing layer 39 may then determine a first difference/delta (delta1) between the first snapshot/dataset (SS0) and the second snapshot/dataset (SS1). The first difference/delta (delta1) may comprise a first changed file list 295 specifying files in the file system that, at the time of the first update (T1), have been changed since the central index 290 was initially produced (at T0). The first changed file list 295 may be used by the search engine 130 to perform the first update of the central index 290.

When the central index 290 is second updated (at time T2), a third snapshot (SS3) of the file system is produced. The differencing layer 39 may then determine a second difference/delta (delta2) between the third snapshot/dataset (SS2) and the second snapshot/dataset (SS1). The second difference/delta (delta2) may comprise a second changed file list 295 specifying files in the file system that, at the time of the second update (T2), have been changed since the central index 290 was just previously/last updated (at T1). The second changed file list 295 may be used by the search engine 130 to perform the second update of the central index 290. Subsequent updates of the central index 290 may be performed in a similar manner.

III. Proxying Search Requests to a Search Engine

Figure 6:
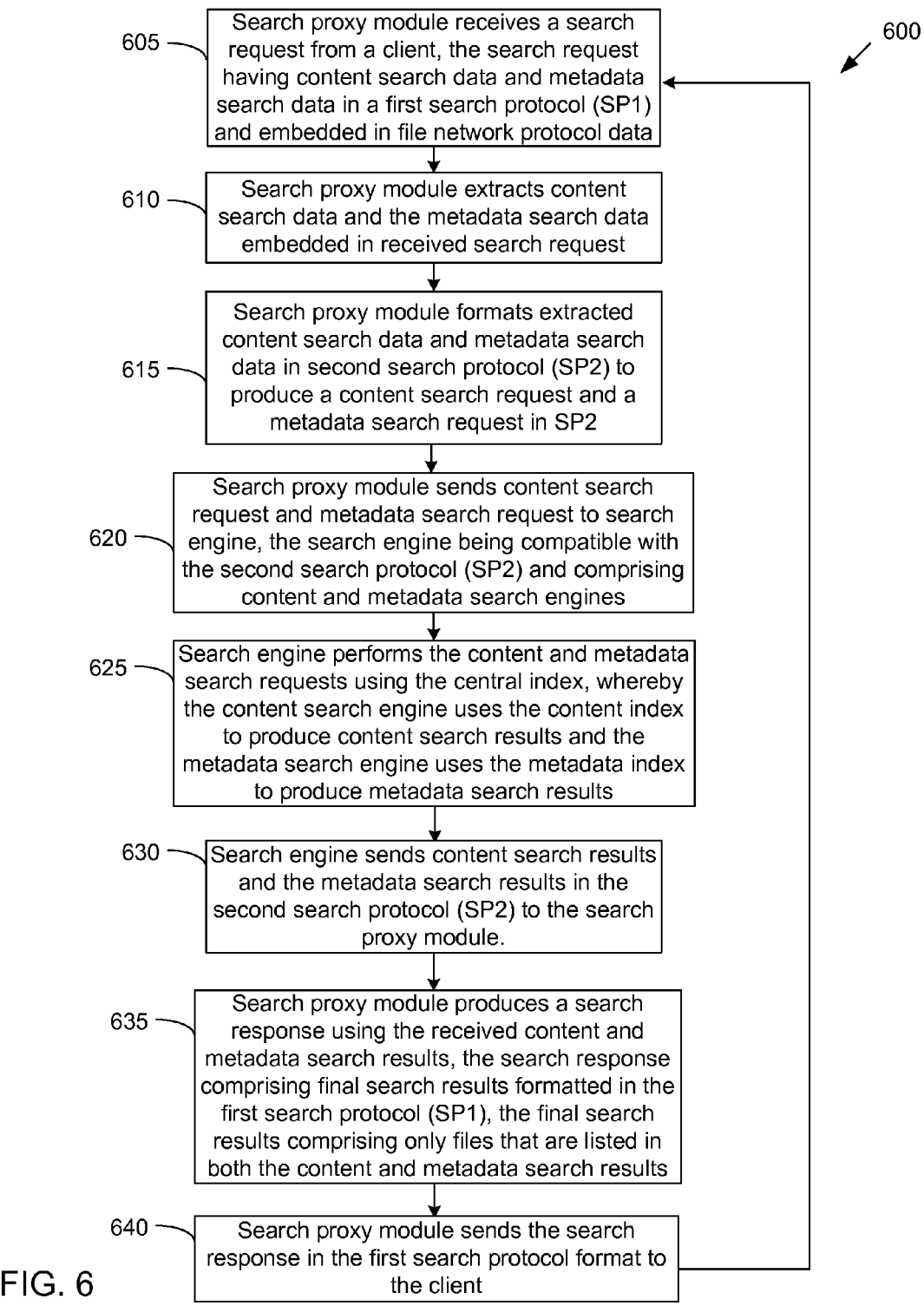
FIG. 6 is a flowchart of a method for proxying search requests to a search engine.

FIG. 6 is a flowchart of a method 600 for proxying search requests to a search engine. In some embodiments, some of the steps of the method 600 are implemented by software and/or hardware. In some embodiments, some of the steps of method 600 are performed by the search proxy module 275 of the storage operating system 300 of the storage system 120 in conjunction with the search engine 130. The search engine 130 may be configured to receive and perform operational requests from the search proxy module 275 to perform embodiments herein. The search engine 130 may be external to the storage system 120 and interacts with the storage operating system 300 via a connection system 150. In other embodiments, the search engine 130 may be internal to the storage system 120. The order and number of steps of the method 600 are for illustrative purposes only and, in other embodiments, a different order and/or number of steps are used. The method 600 is described in relation to FIGS. 7A-C that conceptually illustrate steps of the method 600. The method 600 may be performed concurrently with the method 400 of FIG. 4, which may continually update the central index 290 as the method 600 proxies search requests to the search engine 130. The method 600 may be performed for each received search request.

The embodiments below are described in relation to a file. In other embodiments, however, any other type of data container may be used (e.g., logical unit, volume, etc.). The embodiments below are described in relation to a file system. In other embodiments, however, the file system layer 350 may comprise a management layer (e.g., Zettabyte File System, etc.) for producing a management system for managing and organizing files. The management system may comprise a file system having zero or more nested file systems (a file system within a file system). In these embodiments, the file system described herein may comprise a management system.

Figure 7A:
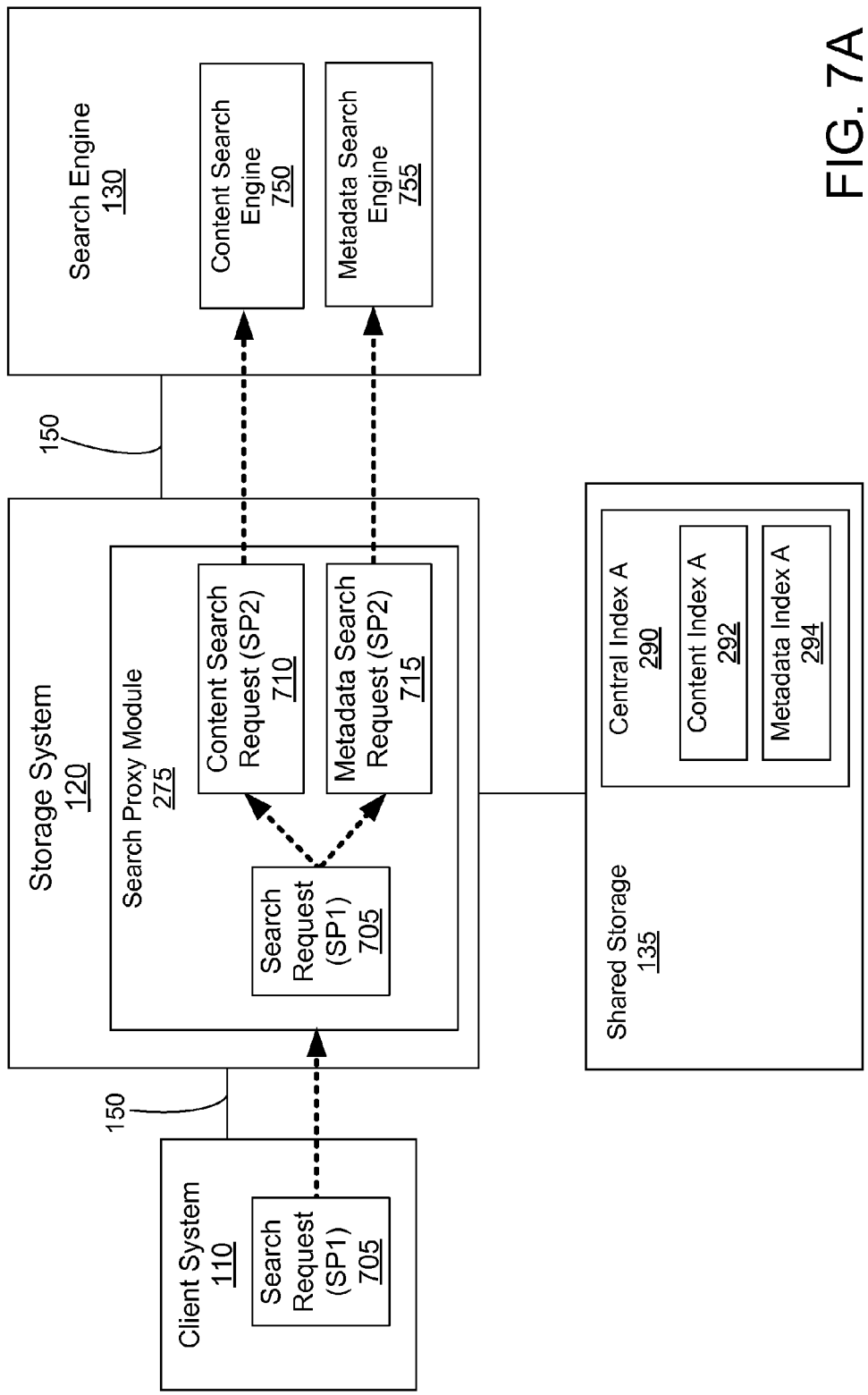
FIG. 7A shows a conceptual diagram of components of the storage system environment used for receiving and converting search requests.

The method 600 begins when the search proxy module 275 receives (at 605) a search request from a client 110. FIG. 7A shows a conceptual diagram of components of the storage system environment 100 used for receiving and converting search requests. As shown in the example of FIG. 7A, the search proxy module 275 may receive a search request 705 from a client 110, the search request 705 being in a first search protocol (SP1). In the embodiments described below, the storage system 120 uses an internal or external search engine 130 configured to process search requests 705 in a second search protocol (SP2) that is different than the first search protocol (SP1).

In some embodiments, the first search protocol (SP1) comprises a search protocol (e.g., WSP) that may be embedded/integrated within a network file protocol (e.g., Common Internet File System protocol or Network File System protocol). In these embodiments, the search request 705 comprises packaging data for the network file protocol ("network file protocol data") and data specifying a requested search to be performed ("search data") that is embedded/integrated within the network file protocol data. The search request 705 may specify a content search request and a metadata search request, whereby the search data of the search request 705 may comprise content search data and metadata search data (each embedded within the network file protocol data).

In the embodiments described below, the received search request 705 specifies search parameters for files in file system A 510, for which central index A 290 is produced and updated by the index manager module 270 for performing the search requests. The content search request/data may specify content search parameters for searching the files of a file system (by using the central index 290), the search results of the content search request comprising files that match the content parameters. In particular, the content search request/data may specify one or more search terms or phrases (e.g., "stocks," "stock market," etc.), the search results for the content search request comprising files containing the one or more specified search terms or phrases. Likewise, the metadata search request/data may specify metadata search parameters for searching the files of a file system (by using the central index 290), the search results of the metadata search request comprising files that match the metadata parameters. In particular, the metadata search request/data may specify one or more file attributes that describe the file (e.g., file size, file type, etc.), the search results for the metadata search request comprising files having the one or more specified file attributes. The search results ("final search results") eventually sent back to the client 110 should comprise only those files that meet both the content and metadata search parameters (as discussed below).

The search proxy module 275 then proxies the received search request 705 to the search engine by performing steps 610-640. The search proxy module 275 does so by first converting the received search request 705 to the second search protocol (SP2) compatible with the search engine 130 by performing steps 610-615. At step 610, the search proxy module 275 extracts the content search data and the metadata search data embedded in the received search request 705. The search proxy module 275 then formats/packages (at 615) the extracted content search data and metadata search data using the second search protocol (SP2) to produce a content search request and a metadata search request in the second search protocol (SP2). For example, the format of the second search protocol may comprise key/value pairs (e.g., content: stocks, user: UserName, etc.). The search proxy module 275 then sends (at 620) the content search request and the metadata search request to the search engine 130.

As shown in the example of FIG. 7A, the search proxy module 275 converts the received search request 705 in the first search protocol (SP1) to a content search request 710 and a metadata search request 715 (both requests formatted in the second search protocol (SP2)), and sends the search requests 710 and 715 to the search engine 130. The search engine 130 may comprise a content search engine 750 and a metadata search engine 755. As such, the content search engine 750 may receive and process the content search request 710 and the metadata search engine 755 may receive and process the metadata search request 715.

Figure 7B:
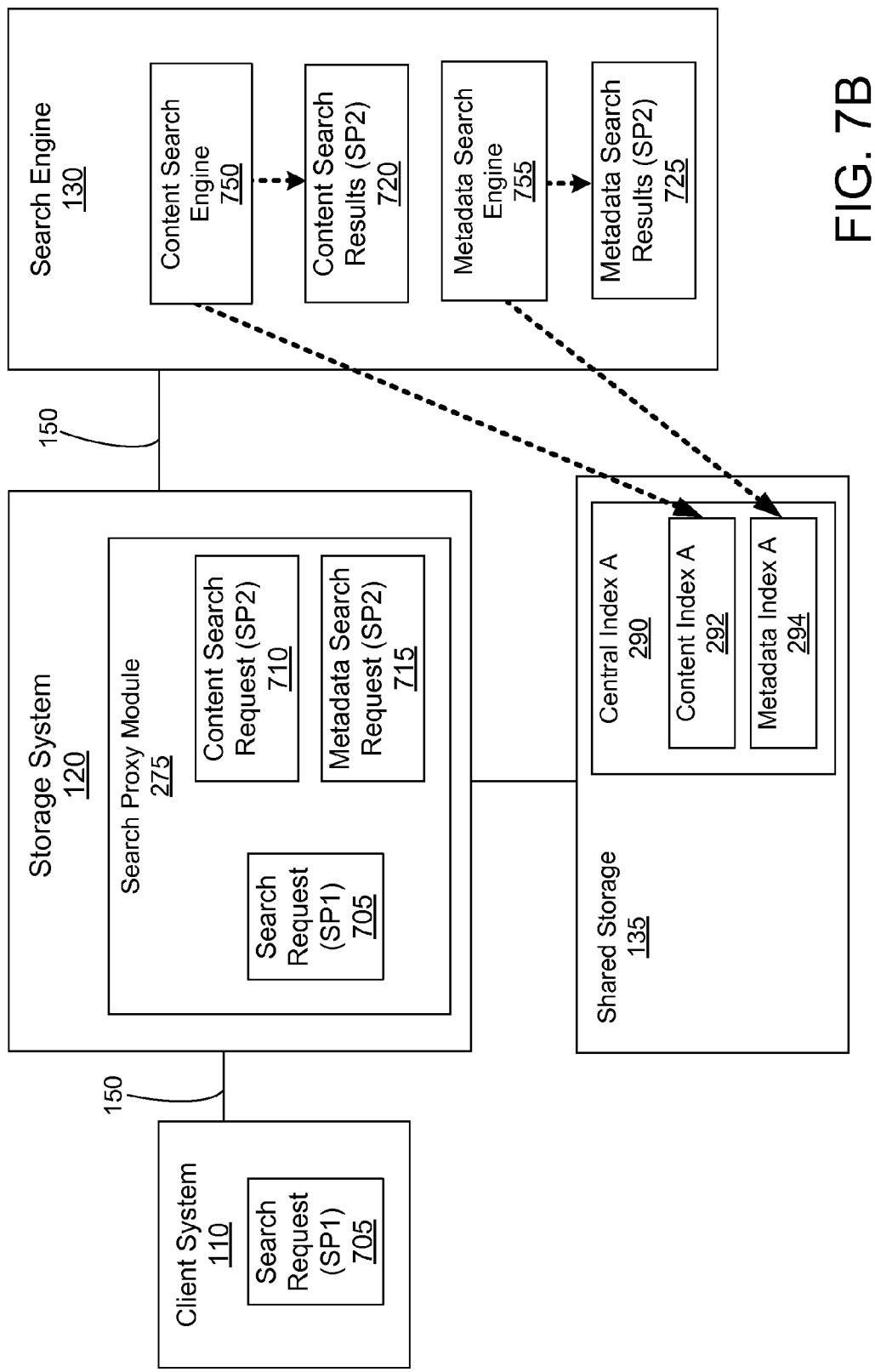
FIG. 7B shows a conceptual diagram of components of the storage system environment used for performing search requests using the central index.

The search engine 130 then performs (at 625) the content and metadata search requests 710 and 715 to produce content and metadata search results using the central index 290. FIG. 7B shows a conceptual diagram of components of the storage system environment 100 used for performing search requests using the central index 290. As shown in the example of FIG. 7A, the content search engine 750 may perform the content search request 710 using the content index 292 of the central index 290 to produce content search results 720. The content search results 720 may comprise a set of zero or more files that match the content parameters specified in the content search request 710. The metadata search engine 755 may perform the metadata search request 715 using the metadata index 294 of the central index 290 to produce metadata search results 725. The metadata search results 725 may comprise a set of zero or more files that match the metadata parameters specified in the metadata search request 715. Note that the search engine 130 may format/package the sets of search results 720 and 725 in the second search protocol (SP2)) prior to sending the results to the search proxy module 275.

The search engine 130 then sends (at 630) the content search results 720 and the metadata search results 725 in the second search protocol (SP2)) to the search proxy module 275. The search proxy module 275 then produces (at 635) a search response using the received content search results 720 and the metadata search results 725, the search response comprising final search results formatted/packaged in the first search protocol (SP1). The search proxy module 275 may do so by determining a set of zero or more files that are listed in both the content search results 720 and the metadata search results 725, the set of files comprising the final search results. As such, the final search results may comprise only those files that meet both the content and metadata search parameters. The search proxy module 275 may then format/package the final search results in the first search protocol (e.g., by adding the necessary network file protocol data) to produce the search response. The search proxy module 275 then sends (at 640) the search response in the first search protocol format to the client 110.

Figure 7C:
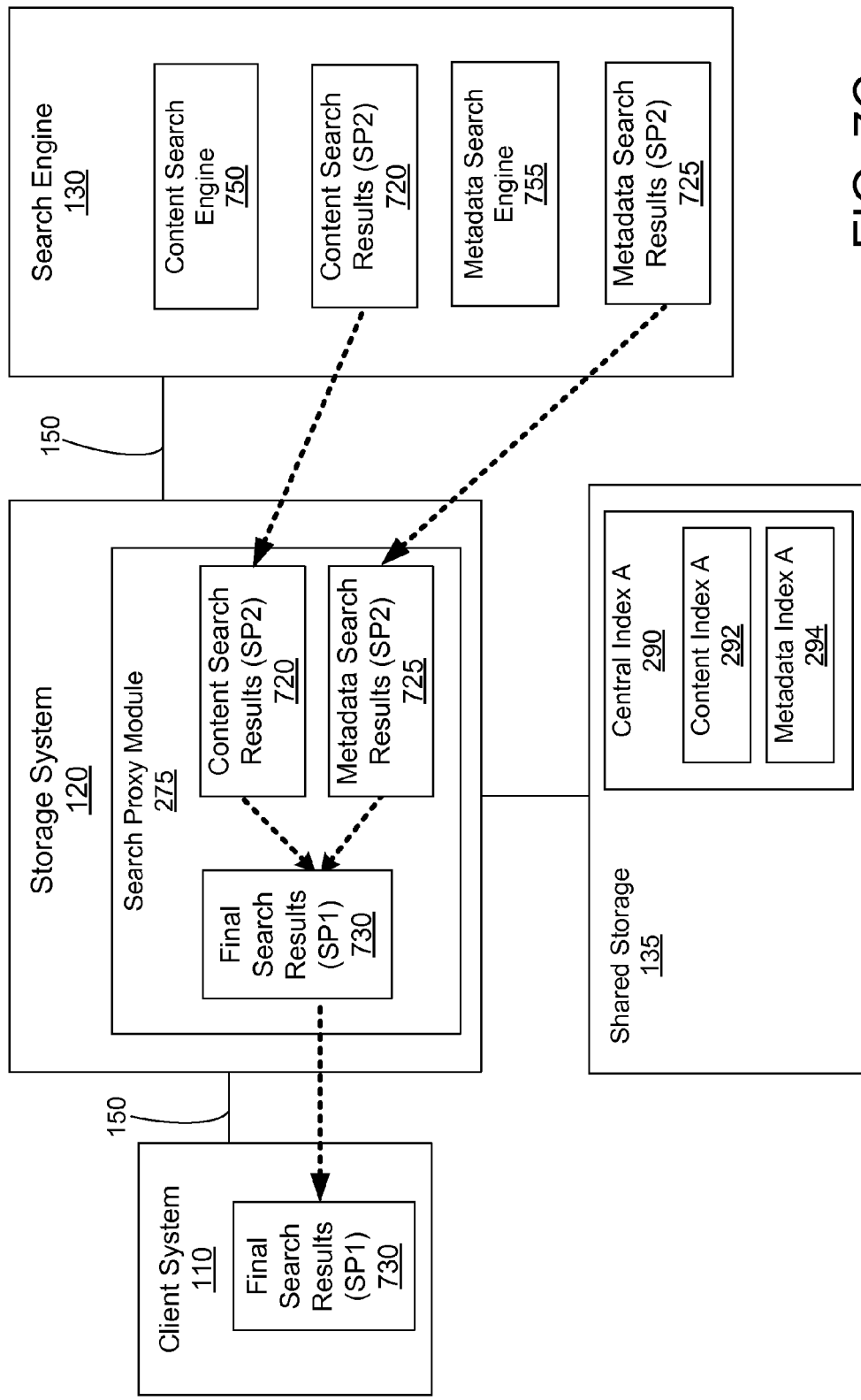
FIG. 7C shows a conceptual diagram of components of the storage system environment used for producing search responses.

FIG. 7C shows a conceptual diagram of components of the storage system environment 100 used for producing search responses. As shown in the example of FIG. 7C, the search proxy module 275 receives the content search results 720 and the metadata search results 725 in the first search protocol (SP1) to produce final search results 730 in the first search protocol (SP1). The search proxy module 275 then sends a search response (comprising the final search results 730 in the first search protocol) to the client 110. As such, the method 600 may proxy received search requests to the search engine 130 transparently, without the client having knowledge of the proxying as the client sends search requests and receives search responses in the first search protocol format per usual. The method 600 then continues at step 605 where it receives a next search request.

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, module, or layer described herein may comprise an engine comprising hardware and/or software configured to perform embodiments described herein. In general, functions of a software application, layer, or module described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A storage system for storing a plurality of data containers and proxying search requests for the data containers to a search engine, the storage system comprising:
computer hardware configured for:
receiving a search request formatted in a first search protocol, the search request comprising content search data and metadata search data embedded within network protocol data;
extracting the content search data and the metadata search data embedded in the received search request;
formatting the extracted content search data and metadata search data using a second search protocol compatible with the search engine to produce a content search request and a metadata search request;
sending the content search request and the metadata search request to the search engine, the content search request and the metadata search request being formatted in the second search protocol, wherein the second search protocol of the content search request and the metadata search request sent to the search engine is different than the first search protocol of the search request received from the client;
receiving, from the search engine, one or more content search results and one or more metadata search results, the content search results and the metadata search results being formatted in the second search protocol;

determining a set of final search results comprising results found in both the content search results and the metadata search results; and sending the final search results to a client, the final search results being formatted in the first search protocol.

2. The storage system of claim 1, wherein:
the content search request specifies one or more search terms or phrases; and
the metadata search request specifies one or more data container attributes.

3. The storage system of claim 1, further comprising:
a shared storage for storing the plurality of data containers and a central index comprising index data describing each data container wherein the search engine uses the central index to perform the content search request and the metadata search request.

4. The storage system of claim 1, wherein:
the search engine comprises a content search engine and a metadata search engine;
the content search engine performs the content search request to produce one or more content search results; and
the metadata search engine performs the metadata search request to produce one or more metadata search results.

5. The storage system of claim 4, further comprising:
a content index comprising terms or phrases stored in the plurality of data containers, wherein the content search engine uses the content index to perform the content search request; and
a metadata index comprising attributes of the plurality of data containers, wherein the metadata search engine uses the metadata index to perform the metadata search request.

6. The storage system of claim 1, wherein:
the set of final search results comprises a search response for the client.

7. A method for storing a plurality of data containers in a storage system and proxying search requests for the data containers to a search engine, the method comprising:
configuring computer hardware for:
receiving a search request formatted in a first search protocol, the search request comprising content search data and metadata search data embedded within network protocol data;
extracting the content search data and the metadata search data embedded in the received search request;
formatting the extracted content search data and metadata search data using a second search protocol compatible with the search engine to produce a content search request and a metadata search request;
sending the content search request and the metadata search request to the search engine, the content search request and the metadata search request being formatted in the second search protocol, wherein the second search protocol of the content search request and the metadata search request sent to the search engine is different than the first search protocol of the search request received from the client;
receiving, from the search engine, one or more content search results and one or more metadata search results, the content search results and the metadata search results being formatted in the second search protocol;

determining a set of final search results comprising results found in both the content search results and the metadata search results; and sending the final search results to a client, the final search results being formatted in the first search protocol.

8. The method of claim 7, wherein:
the content search request specifies one or more search terms or phrases; and
the metadata search request specifies one or more data container attributes.

9. The method of claim 7, further comprising:
storing, on a shared storage of the storage system, the plurality of data containers and a central index comprising index data describing each data container wherein the search engine uses the central index to perform the content search request and the metadata search request.

10. The method of claim 7, wherein:
the search engine comprises a content search engine and a metadata search engine; the content search engine performs the content search request to produce one or more content search results; and
the metadata search engine performs the metadata search request to produce one or more metadata search results.

11. The method of claim 10, further comprising:
storing, to a content index, terms or phrases stored in the plurality of data containers, wherein the content search engine uses the content index to perform the content search request; and
storing, to a metadata index, attributes of the plurality of data containers, wherein the metadata search engine uses the metadata index to perform the metadata search request.

12. The method of claim 7, wherein: the set of final search results comprises a search response for the client.

13. A non-transitory computer readable medium having instructions stored thereon when executed by a processor, store a plurality of data containers in a storage system and proxy search requests for the data containers to a search engine, the non-transitory computer readable medium comprising instructions for:
configuring computer hardware for:
receiving a search request formatted in a first search protocol, the search request comprising content search data and metadata search data embedded within network protocol data;
extracting the content search data and the metadata search data embedded in the received search request;
formatting the extracted content search data and metadata search data using a second search protocol compatible with the search engine to produce a content search request and a metadata search request;
sending the content search request and the metadata search request to the search engine, the content search request and the metadata search request being formatted in the second search protocol, wherein the second search protocol of the content search request and the metadata search request sent to the search engine is different than the first search protocol of the search request received from the client;
receiving, from the search engine, one or more content search results and one or more metadata search results, the content search results and the metadata search results being formatted in the second search protocol;

determining a set of final search results comprising results found in both the content search results and the metadata search results; and sending the final search results to a client, the final search results being formatted in the first search protocol.

14. The non-transitory computer readable medium of claim 13, wherein:

the content search request specifies one or more search terms or phrases; and the metadata search request specifies one or more data container attributes.

15. The non-transitory computer readable medium of claim 13, further comprising instructions for:

storing, on a shared storage of the storage system, the plurality of data containers and a central index comprising index data describing each data container, wherein the search engine uses the central index to perform the content search request and the metadata search request.

16. The non-transitory computer readable medium of claim 13, wherein:

the search engine comprises a content search engine and a metadata search engine;

the content search engine performs the content search request to produce one or more content search results; and the metadata search engine performs the metadata search request to produce one or more metadata search results.

17. The non-transitory computer readable medium of claim 10, further comprising instructions for:

storing, to a content index, terms or phrases stored in the plurality of data containers, wherein the content search engine uses the content index to perform the content search request; and storing, to a metadata index, attributes of the plurality of data containers, wherein the metadata search engine uses the metadata index to perform the metadata search request.

18. The non-transitory computer readable medium of claim 13, wherein:

the set of final search results comprises a search response for the client.

\* \* \* \* \*